United States Patent [19]
Maier-Laxhuber et al.

[11] Patent Number: 5,359,861
[45] Date of Patent: Nov. 1, 1994

[54] ADAPTER FOR AN ADSORPTION SYSTEM AND METHOD FOR UTILIZING THE SAME

[75] Inventors: Peter Maier-Laxhuber; Andreas Becky; Gert Richter; Reiner Wörz, all of München, Germany

[73] Assignee: Zeo-Tech GmbH, Unterscheissheim Bei Munchen, Germany

[21] Appl. No.: 171,273

[22] Filed: Dec. 21, 1993

[30] Foreign Application Priority Data

Dec. 23, 1992 [DE] Germany .................. 4243817

[51] Int. Cl.$^5$ .............................. F25B 19/00
[52] U.S. Cl. ........................ 62/100; 62/269
[58] Field of Search .............. 62/100, 94, 169, 170, 62/269, 270, 480

[56] References Cited

U.S. PATENT DOCUMENTS

| 40,031 | 4/1886 | Csete | 62/269 |
| 934,545 | 9/1909 | Kjaersgaard et al. | 62/269 |

Primary Examiner—John M. Sollecito
Attorney, Agent, or Firm—Hoffmann & Baron

[57] ABSTRACT

Adapter for connecting an adsorption agent container to an operating medium steam source includes a sealing seat for vacuum tight connection to the adsorption agent container and a sealing face for a vacuum tight connection to the operating medium steam source. The adapter further includes a flow conduit which is closed to the outside wherein the flow conduit extends from the operating agent steam source to the adsorption agent container and whereby a separating means prevents the flow of flowing operating medium particles by the operating medium steam flowing through the flow conduit.

9 Claims, 2 Drawing Sheets

ADAPTER FOR AN ADSORPTION SYSTEM AND METHOD FOR UTILIZING THE SAME

BACKGROUND OF THE INVENTION

1. Field of the Invention

The present invention relates to an adapter for an adsorption system, and more particularly to an adsorption system adapter for coupling an adsorption agent container to an operating medium steam source.

2. Description of the Prior Art

In the field of adsorption technology, there are differences between absorption apparatus and adsorption apparatus. Specifically, one evident difference is that adsorption apparatus utilize solid adsorption materials. Adsorption apparatus are known to operate as either closed systems or open systems. When utilizing either a closed or open system, the operating medium is exothermally adsorbed by an adsorption agent. As a result, the operating medium steam source that provides the operating medium is cooled due to the evaporation of the operating medium. Since both the closed and open systems operate during the adsorption phase without air, the system pressure is only generated by the evaporation pressure provided by the operating medium. In contrast to open systems, closed systems operate without the presence of air even after desorption of the operating medium. However, semi-open systems desorb operating medium in an air atmosphere.

Known open systems and closed systems utilize adsorption techniques for generating both heat and cold. In order to generate the heat or cold, adsorption filler is contained in an adsorption container which is in communication with the operating medium steam source. In order to regulate the flow of operating medium steam, a valve is provided between the adsorption filler and the steam source so as to prevent the adsorption reaction when the valve is closed. When the valve is opened, and if a sufficient vacuum pressure is provided, operating medium steam will flow into the adsorption filler. However, if a sufficient vacuum pressure is not present, the air (and corresponding air pressure) contained within the system will prevent a rapid adsorption reaction.

Closed adsorption systems are relatively inflexible because they require the presence of a permanent vacuum for operation. Since the adsorption filler and the steam source must be fixedly connected with each other and are therefore not exchangeable, closed apparatuses have relatively limited applications. In contrast, semi-open systems are substantially more flexible, since a simple exchange between the steam source and the adsorption container can occur because a permanent vacuum pressure need not be sustained.

OBJECTS AND SUMMARY OF THE INVENTION

It is an object of the present invention to provide an adsorption system adapter for coupling an adsorption agent container to an operating medium stream source.

It is a further object of the present invention to provide an adsorption system adapter and method of using the same which overcomes the inherent disadvantages of known adsorption system adapters and methods.

In accordance with one form of the present invention, an adapter for coupling an adsorption agent container, having adsorption agent therein, to an operating medium steam source, having operating medium therein, includes a sealing seat for coupling the adsorption agent container to the adapter in a vacuum tight manner. The adapter further includes a sealing face for coupling the operating medium steam source to the adapter in a vacuum tight manner.

The adapter also includes a flow conduit which provides fluid communication between the operating medium steam source and the adsorption agent container when both the adsorption agent container and the operating medium steam source are coupled to the adapter. Separating means is also included which defines a tortuous path for substantially permitting a flow of operating medium steam and substantially preventing operating medium particles from traversing through the flow conduit.

These and other objects, features, and advantages of this invention will be apparent from the following detailed description of illustrative embodiments thereof, which is to be read in connection with the accompanying drawings.

DETAILED DESCRIPTION OF THE PREFERRED EMBODIMENTS

Figure 1:
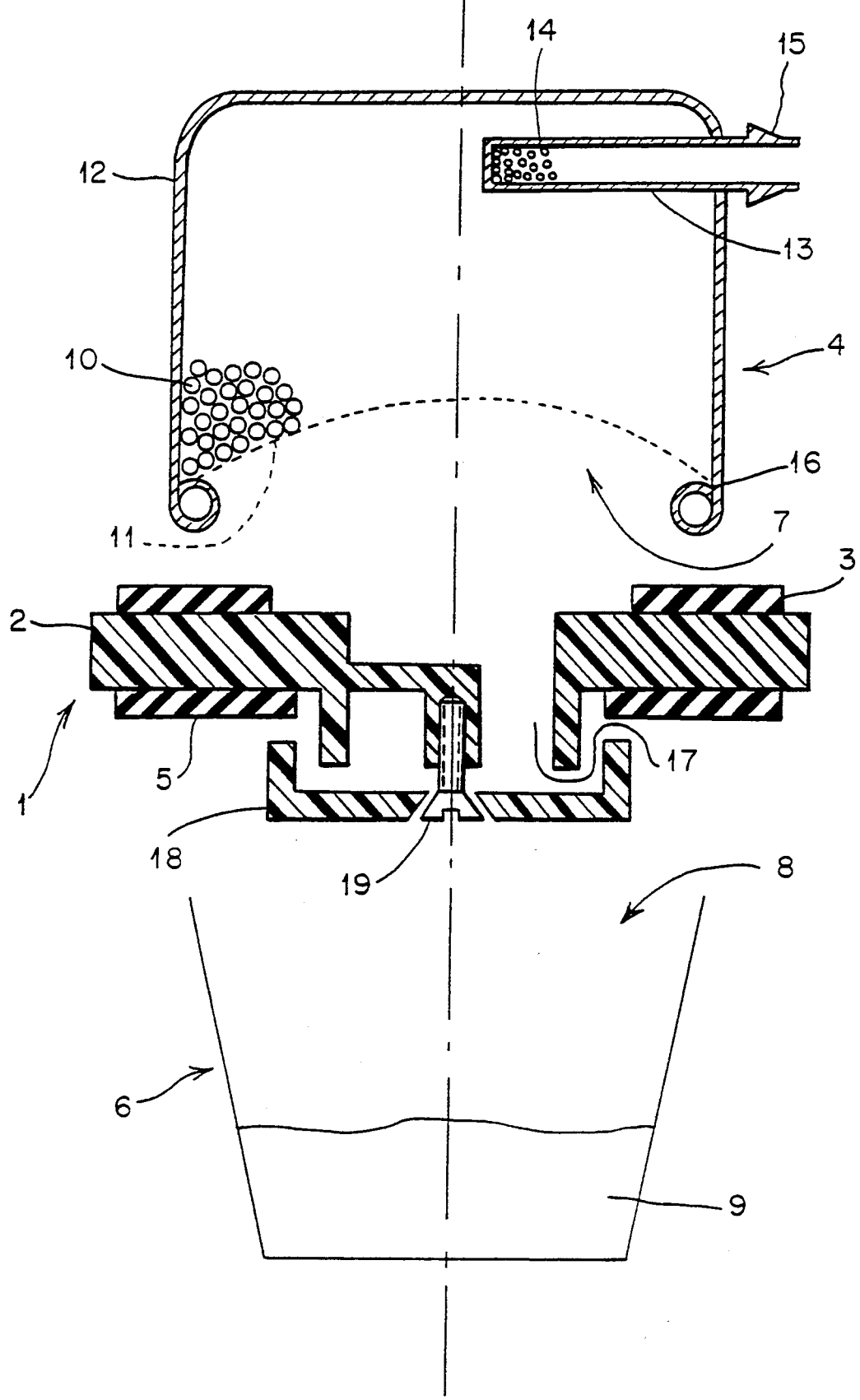
FIG. 1 is a cross-sectional view of the adsorption system adapter for coupling an adsorption agent container to an operating medium steam source constructed in accordance with the present invention.

Referring now to FIG. 1 of the drawings, an adsorption system adapter for coupling a variety of different adsorption agent containers to a variety of different operating medium steam sources constructed in accordance with the present invention will now be described. The adapter 1 preferably includes a "disk-like" base body 2 with a sealing seat 3 for a vacuum tight connection of an absorption agent container 4 to the adapter. The adapter also preferably includes a sealing face 5 for a vacuum tight connection of an operating medium steam source 6 to the adapter. The sealing seat 3 and the sealing face 5 are preferably formed by a soft rubber ring. The sealing seat of the adapter is designed to connect to an inlet opening 7 of the absorption agent container 4, while the sealing face of the adapter is designed to connect to an outlet opening 8 of the operating medium source 6, in a vacuum tight manner.

In a preferred form of the present invention, the lower part of the operating medium steam source 6 is substantially filled with an aqueous liquid 9, and the adsorption agent container 4 is substantially filled with an absorption agent 10. The adsorption agent is preferably in a solid granular form. The adsorption agent container further includes a screen 11 which is designed to retain the absorption agent within the adsorption agent container and prevent the adsorption agent from falling out through inlet opening 7. The screen 11 is preferably held in place by an inner shoulder 16 of the adsorption container. The adsorption agent container 4 further includes a metallic cover 12 which has a vacuum pipe 13 through one region. The vacuum pipe includes an inner end having holes 14 therethrough contained within the adsorption agent container, and an outer end with a hose connection means 15 attached thereto. A vacuum device (not shown) may be connected to the connection means in order to facilitate the removal of air and nonabsorbed gases from the adsorption agent container through holes 14 and vacuum pipe 13.

In a preferred embodiment of the present invention, the adapter base body 2 is provided with a flow conduit 17 for permitting the fluid communication of the absorption agent container 4 and the operating medium steam source 6. Specifically, the flow conduit 17 permits the flow of operating medium steam from the steam source 6 into the adsorption agent container 4. The adapter 1 further includes a separating means 18 mounted on the base body 2. The separating means 18 may be coupled to the base body by means of a threaded screw 19. The separating means is mounted to the base body in such a manner that the flow conduit includes a tortuous path for preventing a direct straight-line flow of operating medium steam from the steam source to the adsorption agent container. As a result of the tortuous path of flow conduit 17, non-vapor particles which may have been included in the operating medium steam will be prevented from contacting the adsorption agent filler 10.

Figure 2:
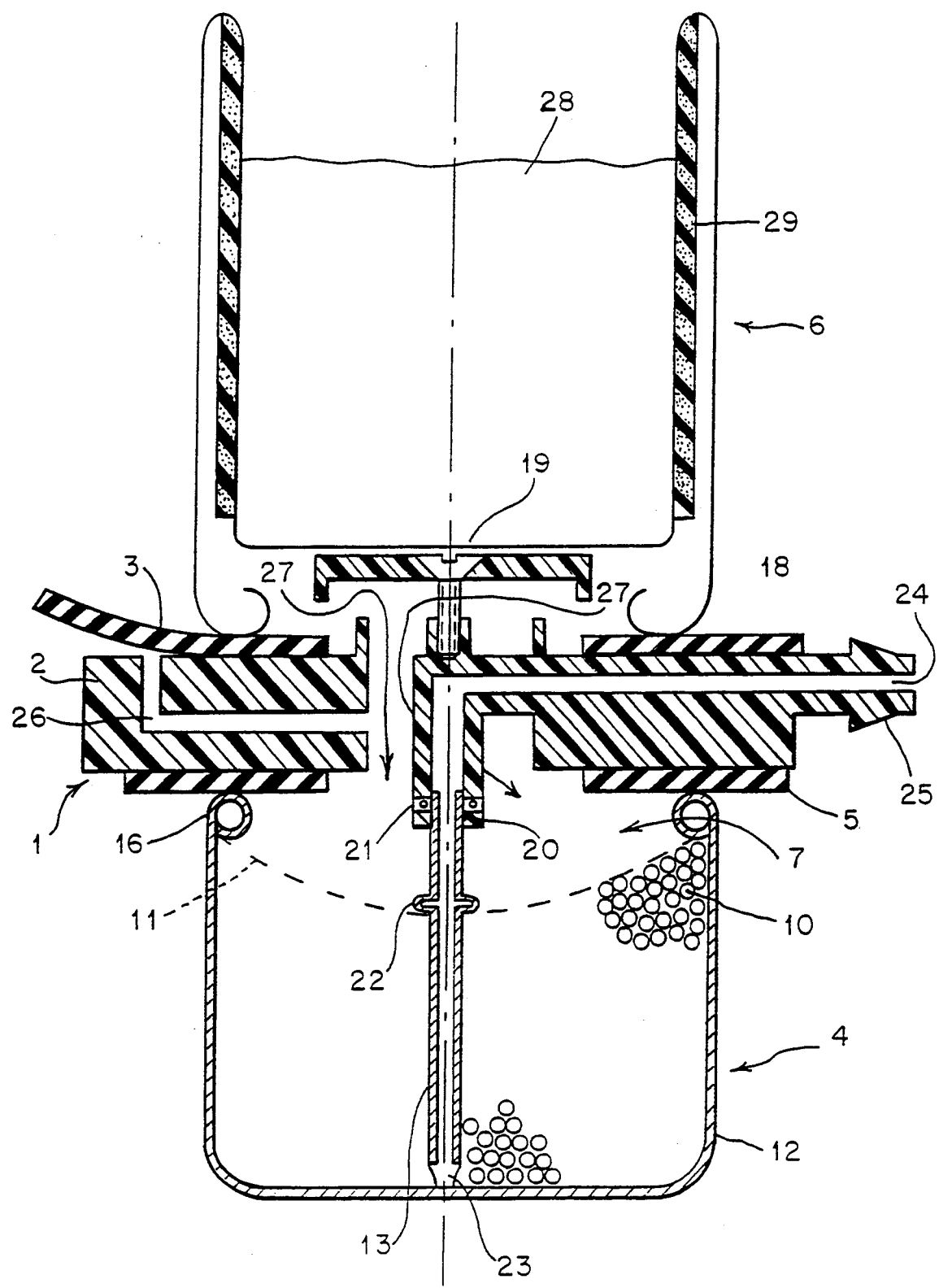
FIG. 2 is a cross-sectional view of the adsorption system adapter for coupling an adsorption agent container to an operating medium steam source constructed in accordance with the present invention.

Referring now to FIG. 2 of the drawings, an alternative form of the present invention will now be described. The adapter 1 of the present invention is shown in FIG. 2 as being connected to a cylindrical adsorption agent container 4 and to a cylindrical operating medium steam source 6. In contrast to the embodiment of FIG. 1, the vacuum line 13 of FIG. 2 extends through inlet opening 7, and the vacuum line is detachably coupled to the adapter by vacuum connector 20 which includes an O-ring seal 21. The adsorption container 4 of FIG. 2 also includes a screen 11 which engages vacuum line 13 by means of shoulders 22. Screen 11 is also secured to metallic cover 12 of adsorption container 4 by means of shoulders 16. Preferably, one end of the vacuum line 13 is coupled to the bottom of the adsorption agent container 4 as shown in FIG. 2. In a preferred embodiment, a plurality of openings 23 are located at the end of vacuum line 13 at a region proximate to where it is coupled to the adsorption agent container. The openings 23 are included for permitting the expulsion of air and nonadsorbed gases from the adsorption medium 10 proximate to the openings 23. The air and nonadsorbed gases are preferably expelled from sorption medium through vacuum line 13 and vacuum bore 24 by a vacuum device (not shown). The vacuum device may be connected to connector 25 by a flexible hose (not shown).

The adapter 1 also includes a bore 26 which is utilized for venting the operating medium steam source 6 and adsorption medium container 4. During normal operation, bore 26 is closed by sealing seat 3 to maintain a closed system and vacuum pressure. However, when the operating medium container 6 or adsorption medium container 4 are to be replaced, the vacuum pressure of the system is reduced by simply removing sealing seat 3 from bore 26 so that the appropriate container can be removed from the adapter and replaced.

In a preferred embodiment of the present invention, the adapter 1 also includes separating means 18 coupled to base body 2 by means of screw 19. If screw 19 is rotated a sufficient amount with separating means 18 coupled thereto, the separating means 18 can engage sealing seat 3 and close flow conduit 27 which provides fluid communication between the operating medium container 6 and the adsorption medium container 4. When the separating means engages the sealing seat 3, the adsorption agent container is prevented from receiving a flow of operating medium steam from the operating medium steam source.

In an alternative embodiment of the present invention, the operating medium steam source 6 may include a double-walled container which substantially encloses a beverage 28 for cooling. In the interior of the container double wall, an absorption means 29, such as a sponge-like material, is provided. The absorption means is preferably in good heat conducting contact with the inner surface of the double-walled container. The absorption means 29 is preferably saturated with a liquid such as water. In order to cool the beverage 28, a vacuum pump (not shown) is connected to connector 25 of adapter 1 through a hose (not shown) for removal of air and nonabsorbed gases from the adsorption agent filler 10 through vacuum line 13. The air and nonabsorbed gases are removed from the container 6 until the internal system pressure is lowered below the water vapor steam pressure. Thereafter, water evaporates from the absorption means 29 and flows to the adsorption agent filler causing the absorption means to cool. Heat from the beverage is transferred through the container wall to the absorption means causing more water to evaporate from the absorption means which lowers the temperature of the absorption means once again. The water vapor steam preferably flows proximate to the separating means 18 and into the adsorption agent container 4 in accordance with arrows 27 shown in FIG. 2. The water vapor steam is thereafter adsorbed in the adsorption medium container by the adsorption agent filler 10. Air and nonabsorbed gases are also taken along with the flow of water vapor steam and provided to the adsorption agent filler 10. The nonabsorbed gases and air components are provided through opening 23 and removed from the adsorption medium container by way of the vacuum line 13 and vacuum pump (not shown).

Utilizing the adapter as described above in accordance with the invention, interconnection of a variety of different adsorption agent containers and a variety of different operating medium steam sources is readily possible without additional connection means. During connection of the adsorption agent container to the operating medium steam source, a closed flow conduit is provided for the transfer of operating medium steam from the operating medium steam source to the adsorption agent container which is substantially filled with adsorption agent. Since the operating medium steam source may be a container of any given size having differing amounts of operating medium, it is necessary to provide a separating means between the steam source and the absorption agent container that prevents liquid operating medium particles from being included with the flow of operating medium steam. If liquid operating medium particles are introduced into the adsorption agent filler, the adsorption capacity of the adsorption agent will be rapidly exhausted and therefore the amount of cold generated by the system is severely limited.

All shapes and sizes of containers are suitable for use as the adsorption agent container as long as the chosen container is suitable for receiving solid adsorption agent or liquid absorption agent. Preferably, the container is vacuum tight and, if the adsorption agent is a liquid, the container should also be vacuum resistant. Furthermore, the adsorption agent container should have an inflow opening for the operating medium steam which can be coupled in a vacuum tight manner with the sealing seat of the adapter. The adsorption agent container may also include a heater so that operating medium can be expelled from the adsorption agent and returned to the operating medium steam source container after saturation. The adsorption agent container may also include additional heat exchanger faces so as to disperse the thermal energy of the system to an external medium during the adsorption reaction.

A plurality of known adsorption agents used in the refrigeration technology are suitable as adsorption agents provided that the selected adsorption agent is compatible with the operating medium being utilized. Water is frequently used as the operating medium in semi-open adsorption systems. Operating mediums like alcohols or ammonia are less suitable for use with semi-open systems because semi-open systems are characterized by the operating medium being emitted to the atmosphere.

Zeolite and silicagel are known adsorption agents which can be utilized when water is the operating medium. Zeolites are characterized by the ability to adsorb water vapor steam very rapidly and at high concentrations. Therefore, zeolites are a particularly advantageous absorption agent for semi-open systems, wherein the operating medium is water. It is particularly advantageous to utilize zeolites of the type which adsorb water molecules and which only adsorb relatively small amounts of air components. This type of zeolite does not readily adsorb nitrogen molecules. This is preferable since air components such as nitrogen, which are released during the adsorption of water vapor steam, would tend to affect future vacuum performance and prevent a rapid adsorption reaction. If air components happen to be adsorbed by the adsorption medium, it is preferable to utilize the vacuum device to remove the expelled air components from the adsorption medium.

A plurality of containers are suitable for use as the operating medium steam source container provided that the container has an opening of sufficient size for the operating medium steam to exit, and that this opening is capable of providing a vacuum tight connection with the sealing face of the adapter. Therefore, all containers with a plane edge such as a drinking glass would be suitable for use. In addition, a double wall container which contains an absorption medium such as a sponge within the interior of the double wall and which binds aqueous substances, is preferably in good thermal contact with the inner face (wall) of the container. Containers which are also suitable for use include those capable of receiving a smaller container for placement therein wherein the outer surfaces of the smaller container are in thermal contact with the absorption material. Examples of such a configuration include metallic beverage cans and glass bottles that can be surrounded with a wet jacket.

In order to cool the contents of the smaller container, the smaller container is placed within a suitable receiving container together with the wet jacket. The receiving container is thereafter coupled with this vacuum tight opening to the sealing face of the adapter so that air and nonabsorbed gases can be expelled from the adsorption agent by means of a vacuum device which is also coupled to the adapter. As soon as the vapor pressure of the adsorption agent container falls below the operating medium steam pressure of the aqueous substance, the aqueous substance evaporates and thereby cools itself as well as the smaller container to which the aqueous substance is thermally in contact. The operating medium steam which is generated flows through the flow conduit to the adsorption agent container where it is adsorbed by the absorption agent. The adsorption agent increases in temperature and preferably emits the heat energy through the adsorption agent container walls to the environment. The connection of the vacuum device to the adsorption agent container must be such that only air and nonabsorbed gases are removed from the adsorption container and substantially no operating medium steam which flows into the adsorption agent filler is expelled.

If the vacuum device is permitted to operate for a long enough period of time, the aqueous substance (i.e., beverage to be cooled) may be cooled until it solidifies. If the aqueous substance to be cooled is water, the solidifying vapor steam pressure is at 6.1 mbar. Therefore, the vacuum device employed would preferably reach a pressure of less than 6.1 mbar.

In a preferred embodiment of the present invention, the base body of the adapter is shaped like a disk wherein the sealing seat for attachment to the adsorption agent container is coupled to one face of the base body and the plane sealing face for attachment to the operating medium steam source is coupled to an opposite face. Since all adsorption agent containers and water steam sources generally have a cylinder-like geometry, space and material is saved with a disk-like adapter.

In a preferred embodiment of the present invention, the sealing seat and the sealing face are arranged on opposite surfaces of the base body such that they are located in parallel opposed planes. If the adsorption agent container and the operating medium steam source have suitable support faces, the water steam source or the adsorption agent container may alternatively serve as support. In this manner, the operating medium steam sources with upper positioned as well as with lower positioned exit openings may be coupled to an adsorption agent container with a single adapter.

It is preferable to equip the adapter with a mounting means for coupling the adsorption agent container to the adapter. Therefore, removal of the adapter from the adsorption agent container can be prevented without the elimination of system vacuum pressure. This is particularly advantageous if the adapter is also used for covering the adsorption agent container during period of non-use. It is preferable to close the adsorption agent container during periods of non-use if there is substantial humidity in the environment which may impair the adsorption capacity of the adsorption agent. In such a situation, it is advantageous if the separating agent is a droplet separator as shown in FIG. 1 which can close the flow conduit and eliminate the fluid communication between the operating medium steam source and the adsorption agent container.

When a vacuum device is coupled to the system for the purpose of assisting in the removal of air and nonadsorbable gases from the adsorption medium container, the system must be ventilated in order to separate the operating medium steam source from the adapter. In order to ventilate the system, it is advantageous to provide the adapter with a vent valve through which the operating medium steam source is directly vented. As a result, the adapter will also prevent the flow of operating medium steam from providing dust particles from the adsorption agent filler into operating medium steam source when the adsorption system is vented.

As previously mentioned, air and nonabsorbed gases are removed from the adsorption agent filler with the assistance of the vacuum pump. In order to facilitate this vacuum process, a suction pipe having one end within the adsorption agent container and a second end outside the adsorption agent container are provided with a connector for coupling to the vacuum pump. When removing an adsorption agent container from the adapter, typically two connections have to be disconnected for removal of the saturated container and reconnected in order to install a new unsaturated adsorption agent cartridge. For this purpose, the adapter in accordance with the present invention includes a separate connector for coupling the vacuum pump so that the adsorption agent container need only be disconnected from the adapter and not from the vacuum pump. In accordance with the invention, this connection may be an immerser pipe having one end fixed in the adapter with a suitable connecting socket for coupling to the vacuum pump, while its other end penetrates deep into the adsorption agent container so as to assist in the removal of air and nonabsorbed gases. The insertion of the immerser pipe into the adsorption agent container is preferably performed with the sealing seat and through the inlet opening of the operating medium steam source container into the adsorption agent container. However, the vacuum line can be fixedly mounted onto the adsorption agent container and exchanged when the adsorption container is replaced. Furthermore, in order to be able to remove air and nonabsorbed gases through the adapter with a vacuum device, an additional vacuum connection is preferably provided which connects the vacuum line with the adapter within the sealing seat.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

We claim:

1. An adapter for coupling an adsorption agent container, having adsorption agent therein, to an operating medium steam source having operating medium therein, said adapter comprising:
   a sealing seat coupling the adsorption agent container to the adapter in a vacuum tight manner,
   a sealing face for coupling the operating medium steam source to the adapter in a vacuum tight manner,
   a flow conduit providing fluid communication between the operating medium steam source and the adsorption agent container when the adsorption agent container is coupled to the sealing seat and the operating medium steam source is coupled to the sealing face, and
   separating means defining a tortuous path for substantially permitting a flow of operating medium steam through the flow conduit and substantially preventing operating medium particles from traversing through the flow conduit.

2. The adapter as defined by claim 1 further comprising:
   a base body, the base body having first and second surfaces, the sealing seat for coupling said absorption agent container being located on the first surface, the sealing face for coupling said operating medium steam source being located on the second side.

3. The adapter as defined by claim 1 further comprising:
   a mounting device for coupling of said adsorption agent container to said adapter.

4. An adapter as defined by claim 1 wherein said separating means is a droplet separater, said separating means being capable of preventing fluid communication through said flow conduit between the operating medium steam source and the adsorption agent container.

5. An adapter as defined by claim 1 further comprising:
   a selectively opened venting valve coupled to said base body, the selectively opened venting valve uncoupling said operating medium steam source from the adapter when said venting valve is opened.

6. An adapter as defined by claim 1 further comprising:
   connecter means, the connecter means coupling said adapter to a vacuum pump for expulsion of air and nonabsorbed gases from said adsorption agent filler.

7. An adapter as defined by claim 6, further comprising:
   a vacuum connection and a vacuum line, the vacuum connection being coupled to the vacuum line, the vacuum connection providing a means through which gases can be expelled from adsorption container.

8. A method for utilizing an adapter for an adsorption system, the adapter coupling an adsorption agent container having adsorption agent therein, to an operating medium steam source having operating medium therein, the adapter including a sealing seat for coupling the adsorption agent container to the adapter in a vacuum tight manner, a sealing face for coupling the operating medium steam source to the adapter in a vacuum tight manner, a flow conduit providing fluid communication between the operating medium steam source and the adsorption agent container when the adsorption agent container is coupled to the sealing seat and the operating medium steam source is coupled to the sealing face, and separating means defining a tortuous path for substantially permitting a flow of operating medium steam and substantially preventing operating medium particles from traversing through the flow conduit, the method comprising:
   vacuum tight sealing the adsorption agent container to the sealing seat;
   vacuum tight sealing the operating medium steam source to the sealing face;
   removing air and nonabsorbed gases such that operating medium evaporates creating operating medium steam, a temperature of the operating medium being reduced as operating medium steam is generated, the operating medium steam flowing through said flow conduit into said adsorption agent container wherein the operating medium steam is exothermically adsorbed by the adsorption agent.

9. A method for utilizing an adapter for an adsorption system as defined by claim 8 further comprising:
   cooling said operating medium to such an extent that the operating medium solidifies.

* * * * *